(12) United States Patent
Maruyama

(10) Patent No.: US 7,054,254 B2
(45) Date of Patent: May 30, 2006

(54) HIGH NA OBJECTIVE LENS FOR OPTICAL PICK-UP

(75) Inventor: Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 342 days.

(21) Appl. No.: 10/244,669

(22) Filed: Sep. 17, 2002

(65) Prior Publication Data

US 2003/0152014 A1    Aug. 14, 2003

(30) Foreign Application Priority Data

Sep. 18, 2001    (JP)    ............... 2001-283538

(51) Int. Cl.
*G11B 7/135*    (2006.01)
(52) U.S. Cl. .............. 369/112.26; 369/44.23
(58) Field of Classification Search ............ 369/44.23, 369/44.32, 112.23, 112.24, 112.25, 112.26
See application file for complete search history.

(56) References Cited

U.S. PATENT DOCUMENTS

| 15,939 | A | * | 10/1856 | Kubo | ............... | 292/83 |
| 5,754,513 | A | * | 5/1998 | Yagi et al. | ............... | 369/53.22 |
| 6,058,095 | A | * | 5/2000 | Yamamoto et al. | .... | 369/112.23 |
| 6,118,594 | A | * | 9/2000 | Maruyama | ............... | 359/719 |
| 6,411,442 | B1 | * | 6/2002 | Ota et al. | ............... | 359/642 |
| 2001/0015939 | A1 | | 8/2001 | Kubo | | |

FOREIGN PATENT DOCUMENTS

JP    11190818    7/1999

OTHER PUBLICATIONS

English Language Translation for JP Appln. No. 11-190818.

* cited by examiner

*Primary Examiner*—Hoa T. Nguyen
*Assistant Examiner*—Van T. Pham
(74) *Attorney, Agent, or Firm*—Greenblum & Bernstein, P.L.C.

(57) ABSTRACT

A single-element objective lens is employed in an optical pick-up. The objective lens directs an incident light beam to a data recording surface of an optical disc through a cover layer to form a beam spot thereon. A numerical aperture of the objective lens is 0.7 or more. The objective lens is configured such that a characteristic of aberration which is generated due to decentering of surfaces of the objective lens is substantially comparable to a characteristic of aberration due to an inclination of an optical axis of the objective lens and an inclination of a central axis of the light beam incident on the data recording surface of the optical disc with respect to the optical disc.

10 Claims, 8 Drawing Sheets

NA=0.85

— SA
--- SC

-0.005  0.005

Y=0.00    +0.10

-0.10

Y=0.00   +0.10

-0.10

HIGH NA OBJECTIVE LENS FOR OPTICAL PICK-UP

BACKGROUND OF THE INVENTION

The present invention relates to an objective lens for an optical pick-up of an optical disc drive, and more particularly to an objective lens having an NA (numerical aperture) of 0.7 or more. The invention also relates to an optical pick-up employing such an objective lens.

The NA of such an objective lens is determined in accordance with a data density of a recording medium. For example, the NA of an objective lens of an optical pick-up for a CD (compact disc) is approximately 0.45. The NA of the objective lens for a DVD (digital versatile disc) is approximately 0.6.

The objective lens of the CD drives or DVD drives is generally a single element lens having aspherical surfaces as both refraction surfaces. The objective lens for the CD or DVD drive is required such that spherical aberration is well compensated for in order to converge an incident light beam as a diffraction limited spot.

Further, abaxial coma should also be compensated counting allowances for manufacturing and/or assembly errors. To meet the above requirements, the conventional objective lens, which is typically a single lens having aspherical surfaces, is designed such that the spherical aberration is compensated in a predetermined reference status (which is generally a status where parallel light is incident on the objective lens), and a sine condition is satisfied.

In the meantime, an objective lens for an optical pick-up is generally formed using a metal mold. When the metal molding is used, a clearance for moving the molding is required. Due to this clearance, between a first surface (i.e., a light source side surface) and a second surface (i.e., an optical disc side surface), a decentering (i.e., a shift between the first and second surfaces in a direction perpendicular to the optical axis) ranging from 0.001 mm through 0.004 mm occurs. Since the NA of the conventional objective lenses for the CD and/or DVD is relatively small, high order aberrations are relatively small, and since design freedom for the focal length and working distance (i.e., a distance between the surface of the objective lens closest to the disc and the surface of the cover layer of the optical disc) is relatively large, the coma due to the decentering of the surfaces can be compensated for by adjusting the surface shape of each refraction surface of the objective lens.

Recently, an optical disc having data recording density higher than that of the DVD is suggested. For such an optical disc, the NA of the objective lens is required to be 0.7 or more. However, if a focal length of the lens is shortened in order to raise the NA with remaining a predetermined working distance, the design freedom for the surface shape of the objective lens is lessened, and it becomes difficult to compensate for the decentering coma by the surface shape of the objective lens. For example, if the NA of an objective lens is 0.7 or higher, the coma generated due to the decentering of 0.004 mm greatly exceeds an allowable range, and such a lens cannot be used as the objective lens.

Japanese Patent Provisional Publication No. HEI 11-190818 discloses a high NA objective lens configured to have two lens elements. The lens disclosed in the publication well suppresses the decentering coma and the spherical aberration, and having a high NA.

However, such an objective lens consisting of two lens elements is larger in weight and volume in comparison with the objective lens having a single lens element. Therefore, for such a lens having two lens elements, a conventional fine actuator, which is designed to move the single element objective lens in its axial direction for focusing, cannot be used.

Further, the two lens elements must be fixed onto a frame and optical axes of the lens elements must be aligned with respect to each other. In such a case, the number of manufacturing processes and the number of components may increase. Further, a working distance (i.e., a distance between a rear surface of the objective lens and a surface of a cover layer of an optical disc) of the objective lens disclosed in the publication is a range of 3.5 µm through 50 µm. This working distance is significantly smaller than that of a single-element objective lens having the same focal length.

SUMMARY OF THE INVENTION

The present invention is advantageous in that it provides a single-element objective lens having an NA of 0.7 or more, and capable of well compensating for decentering coma.

According to embodiments, there is provided a single-element objective lens for an optical pick-up, the objective lens directing an incident light beam to a data recording surface of an optical disc through a cover layer to form a beam spot, a numerical aperture of the objective lens being 0.7 or more. The objective lens is configured such that a characteristic of aberration due to decentering of surfaces of the objective lens is substantially comparable (analogous) to a characteristic of aberration due to an inclination of an optical axis of the objective lens and a central axis of the light beam incident on the data recording surface of the optical disc with respect to the optical disc.

With the above configuration, it becomes possible that the aberration which is generated due to the decentering of two surfaces of the objective lens can be cancelled simply by inclining the optical axis of the objective lens with respect to the optical disc.

In a particular case, the objective lens is configured such that coma is compensated for by inclining an optical axis of the objective lens and the central axis of the light beam incident on the data recording surface of the optical disc with respect to the optical disc.

Further optionally, the objective lens may be configured such that there exists a coefficient $\alpha$ with which condition:

$$-0.01 < \frac{X}{1+X^2} \times \left(-1 + \sqrt{n_0^2 + (n_0^2 - 1)X^2}\right) - h(n_0 - 1)c + \alpha\left(tNA\left(-\frac{1}{n_d} + \frac{\sqrt{1-NA^2}}{\sqrt{n_d^2 - NA^2}}\right)\right) < 0.01$$

is satisfied, wherein, X represents a differentiation, with respect to h, of a function g(h), which is a SAG amount of the first surface of the objective lens at a height h from the optical axis thereof, c represents the differentiation of X with respect to h, $n_0$ represents a refractive index of the objective lens, $n_d$ represents a refractive index of the cover layer, t represents a thickness along the optical axis of the cover layer, NA represents a function NA(h) which is defined as NA(h)=h/f, f being a focal length of the objective lens, h being any value within a range $0 < h \leq h_{max}$, wherein $h_{max}$ is a maximum effective radius of a light beam on the first surface.

In a particular case, the objective lens may be configured such that there exists a coefficient α with which condition:

$$-0.005 < \frac{X}{1+X^2} \times \left(-1 + \sqrt{n_0^2 + (n_0^2 - 1)X^2}\right) -$$

$$h(n_0 - 1)c + \alpha\left(tNA - \frac{1}{n_d} + \frac{\sqrt{1-NA^2}}{\sqrt{n_d^2 - NA^2}}\right) < 0.005$$

is satisfied.

Further, the objective lens may be configured to satisfy a condition:

$$0.08 < \frac{X}{1+X^2} \times \left(-1 + \sqrt{n_0^2 + (n_0^2 - 1)X^2}\right) - h(n_0 - 1)c < 0.30,$$

wherein h being equal to $h_{max}$.

Preferably, the coefficient α may be greater than five and less than twelve.

According to another aspect, there is provided an optical pick-up, which may include a laser source that emits a laser beam, a single-element objective lens as described above, and an inclination adjusting mechanism which adjusts an inclination of an optical axis of the objective lens and a central axis of the laser beam incident on the cover layer with respect to the optical disc.

BRIEF DESCRIPTION OF THE ACCOMPANYING DRAWINGS

FIG. 1 schematically shows a configuration of an optical pick-up to which the present invention is applied;

DETAILED DESCRIPTION OF THE EMBODIMENTS

Hereinafter, objective lenses and optical pick-up employing such objective lenses according to embodiments of the present invention will be described with reference to the accompanying drawings.

Figure 1:
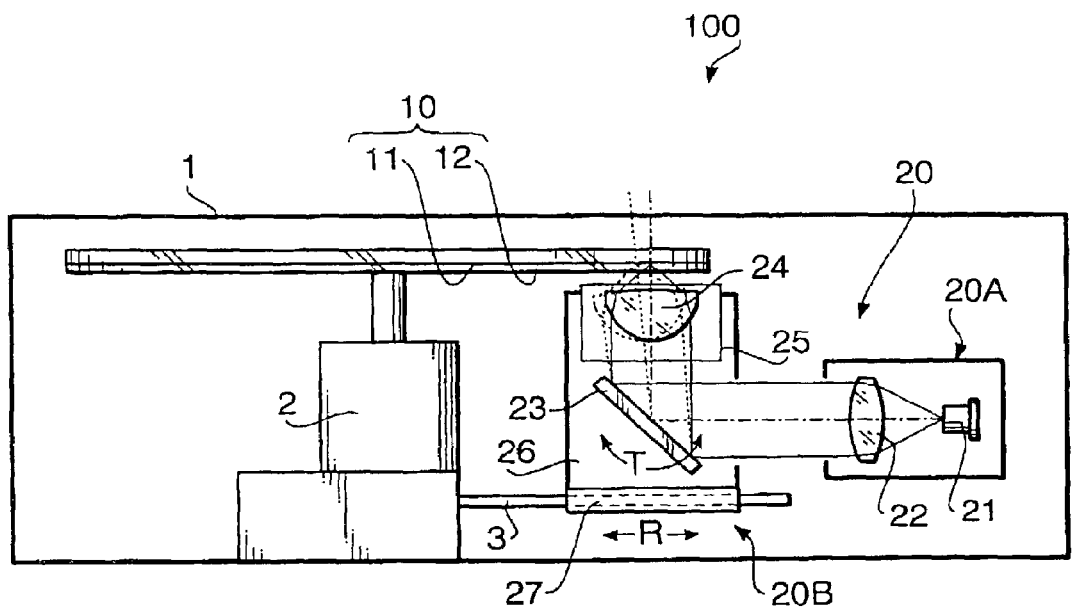

FIG. 1 schematically shows a configuration of an optical disc drive 100, which employs an optical pick-up 20, to which the present invention is applied. The optical pick-up 20 shown in FIG. 1 is used for an optical disc having a high recording density which is higher than a recording density of DVD. An NA of an objective lens 24 employed in the optical pick-up 100 is equal to or more than 0.7. The optical pick-up 100 employs a blue laser beam having a wavelength of 405 nm.

As shown in FIG. 1, the optical disc drive 100 includes a casing 1, which accommodates a spindle motor 2 rotatably supporting an optical disc 10, and an optical pick-up 20 that records/readouts data on the optical disc 10. The optical disc 10 has a data recording surface 11 storing data, and a transparent cover layer 12 covering the data recording surface 11 for protection.

The optical pick-up 20 includes a light source unit 20A fixed to the casing 1 and a movable unit 20B which is slidably supported on a guide rail 3 fixed onto the casing 1. The guide rail 3 extends in a radial direction R of the optical disc 10. The light source unit 20A includes a laser diode 21 which emits a diverging laser beam and a collimating lens 22 which collimates the laser beam emitted by the laser diode 21. In the movable unit 20B, a mirror 23 which reflects the laser beam toward the optical disc 10, and an objective lens 24 which converges the laser beam, through a transparent cover layer 12, on the data recording surface 11. The objective lens 24 is mounted on an objective lens actuator 25 which moves the objective lens 24 for tracking and/or focusing. The light source unit 20A further includes a signal detection optical system for receiving the light reflected by the data recording surface 11 and outputting signals. Since such a configuration is well-known, the signal detection optical system is not shown in FIG. 1 for the sake of simplicity of the drawing.

The movable unit 20B has an optical base 26 mounting the mirror 23 and the objective lens actuator 25, and a slide base 27 slidably secured to the slide rail 3 and mounting the optical base 26. The slide base 27 has a function of adjusting inclination of the optical base 26. Specifically, the slide base 27 is capable of rotating the optical base 26 in a direction T about an axis that is perpendicular to a plane including the optical axis of the collimating lens 22 and the optical axis of the objective lens 24.

The mirror 23 and the objective lens 24 are located at positions indicated by solid lines in FIG. 1 in a reference condition where the optical axis of the objective lens 24 is perpendicular to the data recording surface 11 of the optical disc 10. When the optical base 26 is inclined (i.e., rotated), the mirror 23 and the objective lens 24 are displaced, for example, to positions indicated by broken lines. It should be noted that while only the displaced locations of the mirror 23 and the objective lens 24 are indicated in FIG. 1 for the sake of simplicity, when the optical base 26 is inclined, the objective lens actuator 25 and the optical base 26 are also inclined.

The optical base 26 is inclined in accordance with the decentering of the surfaces of the objective lens 24. It may be possible to provide a mechanism for inclining the optical base 26 in any direction. However, such a mechanism may require complicated and large structure, and increase a manufacturing cost. It is preferable that the inclination adjusting mechanism is configured to incline the optical base only in one direction (i.e., in the direction T), and the orientation of the objective lens 24 is adjusted in accordance with the direction of the decentering between its refraction surfaces.

For this purpose, it may be convenient that a marking is applied on a side surface of the objective lens 24 to indicate the direction of the decentering when the objective lens is manufactured and/or investigated. If the objective lens is formed of plastic in accordance with the injection molding, the decentering direction is fixed depending on a manufacturing lot. Therefore, by sampling some lenses manufactured in the same lot and measuring the decentering direction for each of the sampled lenses, it becomes possible to determined the decentering direction of all the lenses manufactured in the lot. Then, the marking is applied to all the lenses in the lot. If the objective lens is a glass lens, the decentering direction may be different among a plurality of lenses. In such a case, a measurement should be performed for all the lenses.

The objective lens 24 is a single-element lens having an NA of 0.70 or more. Both the first and second surfaces of the objective lens 24 are aspherical surfaces. It should be noted that the first and second surfaces of the objective lens 24 are designed such that the coma generated by the decentering between the first surface and the second surface has a characteristic similar to the coma generated by the inclination of the optical disc 10 with respect to the optical axis of the objective lens 24. Specifically, the first and second surfaces of the objective lens 24 are designed such that the coma generated by the decentering thereof mainly includes a third order component, and higher order components are not generated.

Further, the objective lens 24 may be configured such that there exists a coefficient α with which condition (1) is satisfied, and more preferably condition (2) is satisfied.

$$-0.01 < \frac{X}{1+X^2} \times \left(-1 + \sqrt{n_0^2 + (n_0^2 - 1)X^2}\right) - \quad (1)$$

$$h(n_0 - 1)c + \alpha\left(tNA\left(-\frac{1}{n_d} + \frac{\sqrt{1-NA^2}}{\sqrt{n_d^2 - NA^2}}\right)\right) < 0.01$$

$$-0.005 < \frac{X}{1+X^2} \times \left(-1 + \sqrt{n_0^2 + (n_0^2 - 1)X^2}\right) - \quad (2)$$

$$h(n_0 - 1)c + \alpha\left(tNA\left(-\frac{1}{n_d} + \frac{\sqrt{1-NA^2}}{\sqrt{n_d^2 - NA^2}}\right)\right) < 0.005$$

where, X represents a differentiation g'(h), with respect to h, of a function g(h), which is a SAG amount of the first surface of the objective lens at a height h from the optical axis thereof, c represents the differentiation of X with respect to h, $n_0$ represents a refractive index of the objective lens 24, $n_d$ represents a refractive index of the cover layer 12, t represents a thickness along the optical axis of the cover layer 12, NA represents a function NA(h) which is defined as NA(h)=h/f, f being a focal length of the objective lens 24. Further, h is within a range $0<h \leq h_{max}$, where $h_{max}$ is a maximum effective radius of a light beam.

In a particular case where $h=h_{max}$, condition (3) is satisfied.

$$0.08 < \frac{X}{1+X^2} \times \left(-1 + \sqrt{n_0^2 + (n_0^2 - 1)X^2}\right) - h(n_0 - 1)c < 0.30 \quad (3)$$

The proportionality factor α in condition (1) satisfies condition (4) below.

$$5 < \alpha < 12 \quad (4)$$

In a conventional single-element objective lens having aspherical surfaces, the coma due to the decentering between the first and second surfaces include not only the third order component, but also higher order components. When the optical axis of the objective lens or the central axis of the incident beam is inclined with respect to the cover layer of the optical disc, the coma mainly including the third order component is generated. Therefore, by the conventional lens, the coma generated by the decentering of the refraction surfaces cannot be well compensated for with the inclination of the cover layer since the higher order components reside.

Considering the design freedom of the single-element objective lens having aspherical surfaces, there are six items which are: a paraxial radius r1 of curvature of the first surface; a paraxial radius r2 of curvature of the second surface; a thickness d, a refractive index n, an aspherical shape ASP1 of the first surface; and an aspherical shape ASP2 of the second surface.

In order to achieve the focal length f required by a specification, one of the above six items is selected. For example, the paraxial radius r2 for the second surface is determined to realize a specified focal length. The refractive index n may not usually be changed since it is determined based on a kind of material forming the lens. The thickness d should be determined within a condition where an allowable thickness of the side portion of the lens and a required working distance. Therefore, the design freedom of the thickness d is relatively low. Consequently, the design freedom of the aspherical shapes ASP1 and ASP2, and the paraxial radius r1 of the first surface is relatively high.

With the above three items, it is impossible to completely compensate for the spherical aberration, coma and the decentering coma. That is, with one of the aspherical shapes ASP1 and ASP2, it is possible to compensate for the spherical aberration including the higher order components thereof, and with the other of the aspherical shapes, it is possible to compensate for the coma including the higher order components thereof. However, with the paraxial radius r1, it is possible to vary the amount of the decentering coma by varying the power distribution between the first and second surfaces, but it is impossible to reduce the third order decentering coma and the higher order decentering coma at the same time.

For the objective lens to be employed in an optical pick-up, compensation of the spherical aberration is indispensable. Accordingly, the balance between the compensation of the abaxial coma and the compensation of the decentering coma should be adjusted appropriately. When the optical disc and the optical axis are inclined relative to each other for compensating the coma, the third order decentering coma can be well compensated. Therefore, when an objective lens is designed, it is preferable that the third order coma is allowed to remain, and the higher order coma is well suppressed.

Hereinafter, the designing of such an objective lens will be described in detail.

A sensitivity SWd of wavefront aberration, which is defined as an amount of wavefront aberration which is generated when a cover layer (i.e., a parallel plate) inclines within converging light by 1 rad, is expressed by equation (A).

$$SWd = t\left(\frac{-\sin\theta}{n_d} + \frac{\sin\theta \cdot \cos\theta}{\sqrt{n_d^2 - \sin^2\theta}}\right) \quad (A)$$

where, θ represent an incident angle of a ray on the cover layer when the cover layer is not inclined, t represents a thickness of the cover layer, and $n_d$ represents a refractive index of the cover layer.

Since a sine of the angle θ which is formed between a ray emerging from the objective lens and the optical axis thereof is the NA (i.e., NA=sin θ), equation (A) can be rewritten as equation (A).

$$SWd = tNA\left(-\frac{1}{n_d} + \frac{\sqrt{1 - NA^2}}{\sqrt{n^2 - NA^2}}\right) \quad (B)$$

An amount of aberration, which is generated when the refraction surface of the objective lens is decentered (i.e., parallelly shifted in the direction perpendicular to its optical axis) by Δh, depends on the shape of the decentered surface. For the sake of simplicity, in the description below, the amount of an aberration within a plane which includes the optical axis and extends in a direction of the decentering will be discussed.

A rotationally symmetrical aspherical surface can be defined with a SAG amount. If the SAG amount at a height h with respect to the optical axis is represented by a function g(h), the differentiation g'(h) of the function g(h) with respect to the height h represents an inclination of the surface. The shifting amount of the surface in the direction of the optical axis is represented by g'(h)Δh if the decentering amount is expressed by Δh, and therefore, the optical path length of a ray incident on the surface at a point whose height is h changes by the amount g'(h)Δh.

Generally, an additional optical path length when a ray is incident at an incident angle of θ on a parallel plate whose thickness is t (along a normal to the surface) and whose refractive index is n is expressed as follows.

$$t(-\cos\theta + \sqrt{n^2 - \sin^2\theta})$$

In a case of an objective lens for an optical pick-up, the ray incident on the first surface is generally parallel with the optical axis thereof. Accordingly, if the incident angle with respect to the first surface is represented by θ, tan θ=g'(h).

In view of the above, an additional amount of a wavefront aberration due to the decentering of the surfaces of the objective lens for a light ray which is incident on the first surface of the objective lens at a height h is expressed by (C).

$$\Delta h g'(h)\left(-1 + \frac{\sqrt{n^2 + (n^2 - 1) \cdot (g'(h))^2}}{1 + (g'(h))^2}\right) \quad (C)$$

In the amount represent by (C), a first order paraxial component of the wavefront aberration is included, which should be removed since it is not the aberration based on the decentering. The amount to be subtracted from the amount (C) is h(n−1)c, where c is an paraxial curvature of the surface represented by the function g(h). Thus, the wavefront aberration due to the decentering of the lens surfaces can be represented by (D).

$$\Delta h g'(h)\left(-1 + \frac{\sqrt{n^2 + (n^2 - 1) \cdot (g'(h))^2}}{1 + (g'(h))^2}\right) - h(n - 1)c \quad (D)$$

If the wavefront aberration is represented by a unit of wavelength (λ), the amount represented by (D) is divided by λ. If an amount of the wavefront aberration when the decentering of the lens surface is 1 mm is defined as a sensitivity $SW_0$ of the wavefront aberration, the sensitivity $SW_0$ is represented by an equation (E).

$$SW_0 = g'(h)\left(-1 + \frac{\sqrt{n^2 + (n^2 - 1) \cdot (g'(h))^2}}{1 + (g'(h))^2}\right) - h(n - 1)c \quad (E)$$

By substituting g'(h) with X, the equation (E) can be rewritten as an equation (F).

$$SW_0 = \frac{X}{1 + X^2}\left(-1 + \sqrt{n_0^2 + (n_0^2 - 1)X^2}\right) - h(n_0 - 1)c \quad (F)$$

If the sensitivity SWd obtained from equation (B) is substantially proportional to the sensitivity SW0 obtained from equation (F), the coma which is generated due to the decentering of refraction surfaces of the objective lens, can be compensated by the inclination of the cover layer. That is, if the shape of the first surface is determined (i.e., the paraxial radius r1 (=1/c) and the aspherical surface shape APS1 are determined) so as to satisfy condition (G) below, the aberration which is generated due to the decentering of the lens surfaces is mostly compensated for by the inclination of the cover layer.

$$\frac{X}{1+X^2}\left(-1+\sqrt{n_0^2+(n_0^2-1)X^2}\right)-h(n_0-1)c \cong$$

$$-\alpha \cdot tNA\left(-\frac{1}{n_d}+\frac{\sqrt{1-NA^2}}{\sqrt{n^2-NA^2}}\right)$$

(G)

Therefore, it is preferable that condition (1) is satisfied by appropriately selecting the proportionality factor α. As understood from the above description, condition (1) defines a residual wavefront aberration (unit: mm) per the decentering of 1 mm between the first and second surfaces of the objective lens 24, when the decentering coma is compensated by inclining the cover layer.

For example, if the decentering amount is 0.004 mm, condition (1) requires that the residual wavefront aberration is less than 0.00004 mm. Assuming that the wavelength λ is 0.0004 mm, condition requires the wavefront aberration within a range between −0.1λ and +0.1λ.

Condition (2) requires a narrower range of the residual wavefront aberration. If condition (2) is satisfied for a certain proportionality factor α, there would be no problem with regard to the aberration due to the decentering of the first and second surfaces of the objective lens 24.

Condition (3) defines that the amount of the decentering coma generated due to the decentering of the surfaces of the objective lens falls within a predetermined range. If the condition is lower than the lower limit, coma due to the decentering of the lens surfaces is relatively small. It is preferable in view of compensation of the decentering coma. However, as aforementioned, if the decentering aberration is lower, the abaxial coma increases. Thus, in the above case, the high order components of coma increases. If the condition (3) is greater than the upper limit, residual aberration after the compensation is applied increases. In particular, when the objective lens is a high NA lens, it is important that the upper limit of condition (3) should not be exceeded.

Condition (4) defines the range of the proportionality factor α. The proportionality factor α represents a ratio of variation of aberration due to the decentering of the lens surfaces with respect to the variation of aberration due to the inclination of the cover layer. Specifically, the factor α represents an inclination (unit: radian) of the cover layer per decentering of 1 mm. If the value of the factor α is close to zero, an amount of inclination for adjustment is small. However, if the factor α is smaller than the lower limit, the high order components of the abaxial coma cannot be compensated for. When the factor α satisfies condition (4), a balance between various aberrations can be adjusted appropriately.

Numerical Embodiments

Hereinafter, seven numerical embodiments will be described. In each of the embodiments, indicated is an objective lens which is used for the optical disk 10 provided with a cover layer 12 having a thickness of 0.1 mm.

First Embodiment

Figure 2:
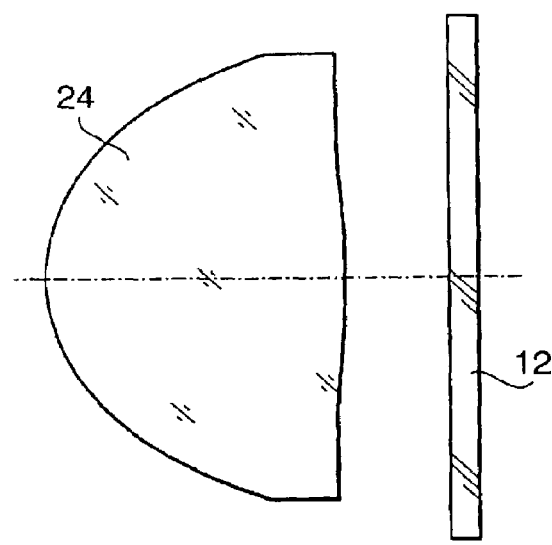
FIG. 2 shows an objective lens according to the first embodiment and the cover layer of the optical disc.

FIG. 2 shows an objective lens 24 according to the first embodiment and the cover layer 12 of the optical disc 10.

TABLE 1 indicates the numerical configuration of the objective lens 24 according to the first embodiment. In TABLE 1 (and following TABLEs), f represents a focal length of the objective lens 24, r represents a radius of curvature (unit: mm) of each surface, d represents a distance (unit: mm) between adjoining surfaces along the optical axis, and n represents a refractive index when a light beam having a wavelength of 405 nm is used. Surface Number #1 and #2 represent the first surface and the second surface of the objective lens 24, respectively; and Surface Number #3 and #4 represent surfaces of the cover layer 12.

TABLE 1

| f = 1.000 Surface Number | NA 0.85 | | |
|---|---|---|---|
| | r | d | n |
| #1 | 0.656 | 1.041 | 1.56023 |
| #2 | −1.677 | 0.370 | |
| #3 | ∞ | 0.100 | 1.62231 |
| #4 | ∞ | | |

Each of the first and second surfaces and is an aspherical surface and is rotationally symmetric with respect to the optical axis.

It is generally known that a rotationally symmetric aspherical surface is expressed by a polynomial indicated below.

$$g(h) = \frac{Ch^2}{1+\sqrt{1-(1+K)C^2h^2}} + A_4h^4 + A_6h^6 + A_8h^8 + A_{10}h^{10} + A_{12}h^{12}$$

where, g(h) is a SAG amount representing a distance between a plane tangential to the aspherical surface at a point where the optical axis intersects with the aspherical surface and a point on the aspherical surface whose height with respect to the optical axis is h; C represents a curvature (=1/r) of the aspherical surface on the optical axis; K is a conical coefficient; and $A_4$, $A_6$, $A_8$, $A_{10}$ and $A_{12}$ are forth, sixth, eighth, tenth, and twelfth order aspherical coefficients. Numerical values of these factors are indicated in TABLE 2.

TABLE 2

| | 1st surface (#1) | 2nd surface (#2) |
|---|---|---|
| K | −0.5000 | 0.0000 |
| $A_4$ | 7.20800 × 10$^{-04}$ | 1.49280 × 10$^{+00}$ |
| $A_6$ | 2.41300 × 10$^{-02}$ | −4.58324 × 10$^{+00}$ |
| $A_8$ | −7.49000 × 10$^{-02}$ | 9.12175 × 10$^{+00}$ |
| $A_{10}$ | 3.32500 × 10$^{-01}$ | −9.97000 × 10$^{+00}$ |
| $A_{12}$ | −4.17000 × 10$^{-01}$ | 4.61000 × 10$^{+00}$ |

Figure 3A:
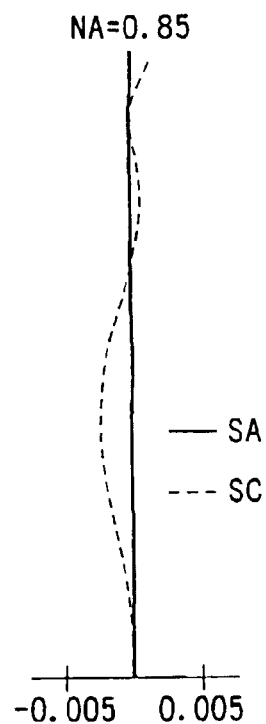
FIG. 3A is a graph showing the spherical aberration and an offence against the sine condition under a reference design condition, according to a first embodiment.

FIG. 3A is a graph showing the spherical aberration SA and an amount SC of an offence against a sine condition under the reference condition, which is a condition where there is no decentering between the first surface and the second surface, and the optical axis of the objective lens is perpendicular to the optical disc 10. In FIG. 3A, a lateral axis indicates the amount of the aberration (unit: mm), and a vertical axis indicates a numerical aperture (NA).

Figure 3B:
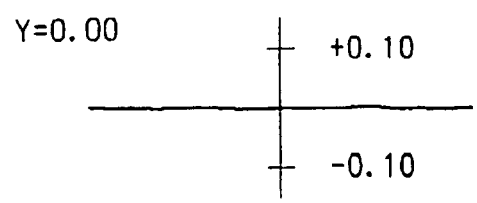
FIG. 3B is a graph showing a wavefront aberration.

FIG. 3B is a graph showing the wavefront aberration. In FIG. 3B, a vertical axis indicates the amount of the aberration (unit: wavelength), and a lateral axis indicates a height from the optical axis.

Figure 4A:
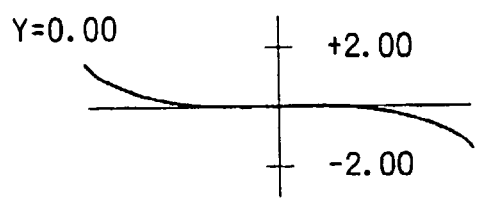
FIG. 4A is a graph showing a wavefront aberration when the decentering of 0.004 mm is generated between the surfaces of the objective lens according to the first embodiment when a compensation has not yet applied.

If the first surface of the objective lens 24 is decentered relative to the second surface by 0.004 mm, unless the optical axis of the objective lens 24 is inclined with respect to the optical disc 10, the decentering coma is generated and the wavefront is disturbed as shown in FIG. 4A. Under this condition, the rms value of the wavefront aberration is 0.189λ, which cannot be used as an objective lens for recording data on the optical disc 10.

Figure 4B:
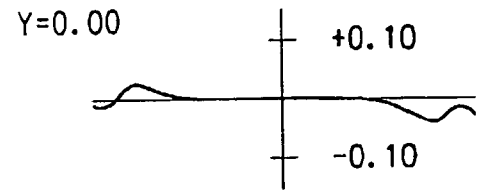
FIG. 4B shows a wavefront aberration when the compensation is applied.

If the optical base 26 is inclined such that the optical axis of the objective lens 24 and the normal to the optical disc 10 form an angle of 1.773°, the wavefront aberration is suppressed as shown in FIG. 4B. In this case, the rms value of the residual wavefront aberration is 0.013λ, which indicates a sufficient performance of the objective lens 24.

As described above, if the objective lens is configured such that the characteristic of the aberrations generated due to the decentering of the surfaces of the lens in the direction perpendicular to the optical axis is analogous (comparable) to the aberration generated due to the inclination of the cover layer relative to the central axis of the incident beam, by inclining the optical axis of the objective lens as well as the beam incident on the optical disc, the decentering coma generated due to the decentering of the lens surfaces of the objective lens can be well compensated.

Second Embodiment

The objective lens 24 according to the second embodiment will be described hereinafter. It should be noted that the objective lenses 25 according to the second through seventh embodiments have substantially the same appearance and therefore drawings corresponding to FIG. 2 will not be provided.

The numerical configuration of the objective lens 24 according to the second embodiment will be indicated in TABLE 3, and coefficients indicating the spherical surfaces thereof are-indicated in TABLE 4.

TABLE 3

| f = 1.001 Surface Number | NA 0.85 | | |
|---|---|---|---|
| | r | d | n |
| #1 | 0.676 | 1.027 | 1.59966 |
| #2 | −2.298 | 0.369 | |
| #3 | ∞ | 0.100 | 1.62231 |
| #4 | ∞ | | |

TABLE 4

| | 1st surface (#1) | 2nd surface (#2) |
|---|---|---|
| K | −0.4743 | 0.0000 |
| $A_4$ | $1.63600 \times 10^{-03}$ | $1.25200 \times 10^{+00}$ |
| $A_6$ | $1.87600 \times 10^{-02}$ | $-3.98300 \times 10^{+00}$ |
| $A_8$ | $-5.26000 \times 10^{-02}$ | $8.26000 \times 10^{+00}$ |
| $A_{10}$ | $2.07300 \times 10^{-01}$ | $-9.45000 \times 10^{+00}$ |
| $A_{12}$ | $-2.82000 \times 10^{-01}$ | $4.60000 \times 10^{+00}$ |

Figure 5A:
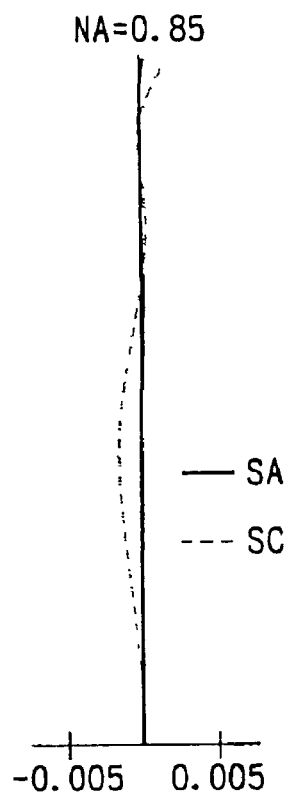
FIG. 5A is a graph showing the spherical aberration and the sine condition under a reference design condition, according to a second embodiment.
Figure 5B:
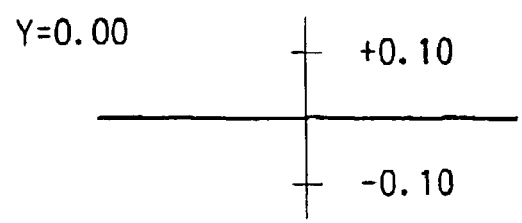
FIG. 5B is a graph showing a wavefront aberration.

FIG. 5A is a graph showing the spherical aberration SA and an amount SC of an offence against a sine condition under the reference condition and the optical axis of the objective lens is perpendicular to the optical disc 10. FIG. 5B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.193λ, which cannot be used as an objective lens for recording data on the optical disc 10.

Figure 6:
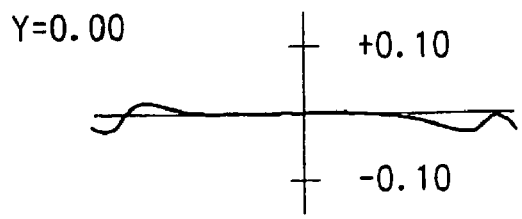
FIG. 6 is a graph showing a wavefront aberration when the decentering of 0.004 mm is generated between the surfaces of the objective lens according to the second embodiment when a compensation is applied.

If the optical base 26 is inclined such that the optical axis of the objective lens 24 and the normal to the optical disc 10 form an angle of 1.810°, the wavefront aberration is suppressed as shown in FIG. 6. In this case, the rms value of the residual wavefront aberration is 0.012λ, which indicates a sufficient performance of the objective lens 24.

Third Embodiment

The objective lens 24 according to the third embodiment will be described hereinafter.

The numerical configuration of the objective lens 24 according to the third embodiment will be indicated in TABLE 5, and coefficients indicating the spherical surfaces thereof are indicated in TABLE 6.

TABLE 5

| f = 1.002 Surface Number | NA 0.85 | | |
|---|---|---|---|
| | r | d | n |
| #1 | 0.754 | 1.026 | 1.76250 |
| #2 | 23.277 | 0.350 | |
| #3 | ∞ | 0.100 | 1.62231 |
| #4 | ∞ | | |

TABLE 6

| | 1st surface (#1) | 2nd surface (#2) |
|---|---|---|
| K | −0.3948 | 0.0000 |
| $A_4$ | $5.20400 \times 10^{-03}$ | $7.46400 \times 10^{-01}$ |
| $A_6$ | $4.90500 \times 10^{-03}$ | $-3.13000 \times 10^{+00}$ |
| $A_8$ | $-1.55000 \times 10^{-02}$ | $8.64000 \times 10^{+00}$ |
| $A_{10}$ | $2.88000 \times 10^{-02}$ | $-1.30000 \times 10^{+01}$ |
| $A_{12}$ | $-7.68000 \times 10^{-02}$ | $8.45000 \times 10^{+00}$ |

Figure 7A:
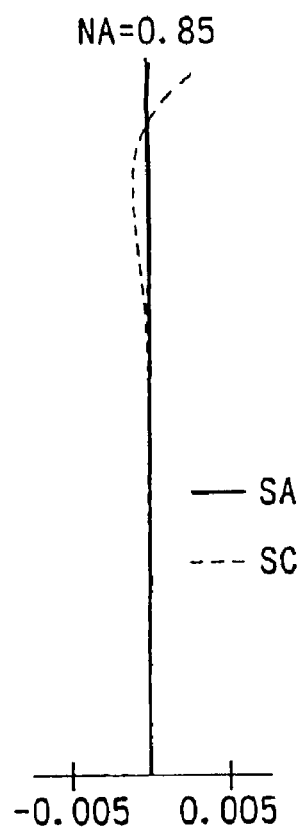
FIG. 7A is a graph showing the spherical aberration and an offence against the sine condition under a reference design condition, according to a third embodiment.
Figure 7B:
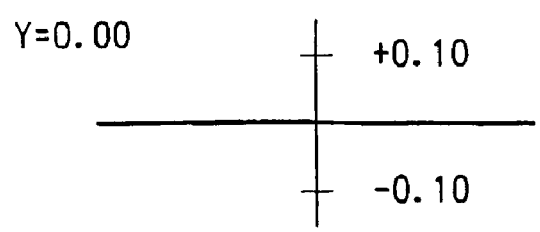
FIG. 7B is a graph showing a wavefront aberration.

FIG. 7A is a graph showing the spherical aberration SA and an amount SC of an offence against a sine condition under the reference condition and the optical axis of the objective lens is perpendicular to the optical disc 10. FIG. 7B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.179λ, which cannot be used as an objective lens for recording data on the optical disc 10.

Figure 8:
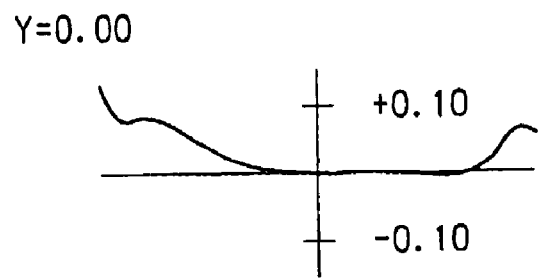
FIG. 8 is a graph showing a wavefront aberration when the decentering of 0.004 mm is generated between the surfaces of the objective lens according to the third embodiment when a compensation is applied.

If the optical base 26 is inclined such that the optical axis of the objective lens 24 and the normal to the optical disc 10 form an angle of 1.706°, the wavefront aberration is suppressed as shown in FIG. 8. In this case, the rms value of the residual wavefront aberration is 0.014λ, which indicates a sufficient performance of the objective lens 24.

Fourth Embodiment

The objective lens 24 according to the fourth embodiment will be described hereinafter.

The numerical configuration of the objective lens 24 according to the fourth embodiment will be indicated in TABLE 7, and coefficients indicating the spherical surfaces thereof are indicated in TABLE 8.

TABLE 7

| | f = 2.350 Surface | NA 0.85 | | |
|---|---|---|---|---|
| Number | | r | d | n |
| #1 | | 1.735 | 2.340 | 1.76250 |
| #2 | | 22.732 | 0.917 | |
| #3 | | ∞ | 0.100 | 1.62231 |
| #4 | | ∞ | | |

TABLE 8

| | 1st surface (#1) | 2nd surface (#2) |
|---|---|---|
| K | −0.4070 | 0.0000 |
| $A_4$ | $5.44800 \times 10^{-04}$ | $5.05480 \times 10^{-02}$ |
| $A_6$ | $1.08200 \times 10^{-04}$ | $-3.19850 \times 10^{-02}$ |
| $A_8$ | $-6.34000 \times 10^{-06}$ | $1.39000 \times 10^{-02}$ |
| $A_{10}$ | $9.10000 \times 10^{-06}$ | $-3.40000 \times 10^{-03}$ |
| $A_{12}$ | $-3.30000 \times 10^{-06}$ | $3.60000 \times 10^{-04}$ |

Figure 9A:
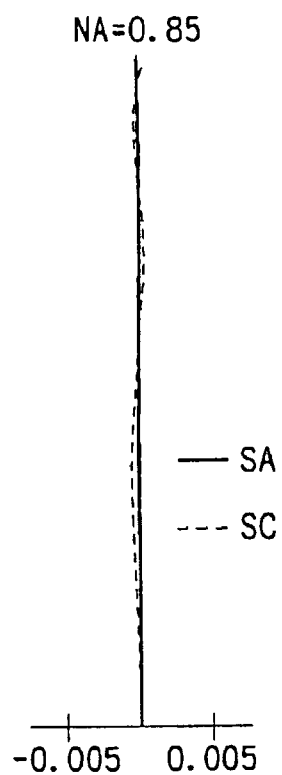
FIG. 9A is a graph showing the spherical aberration and an offence against the sine condition under a reference design condition, according to a fourth embodiment.
Figure 9B:
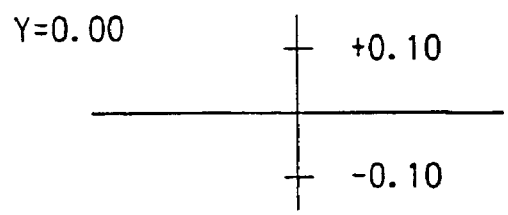
FIG. 9B is a graph showing a wavefront aberration.

FIG. 9A is a graph showing the spherical aberration SA and an amount SC of an offence against a sine condition under the reference condition and the optical axis of the objective lens is perpendicular to the optical disc 10. FIG. 9B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.208λ, which cannot be used as an objective lens for recording data on the optical disc 10.

Figure 10:
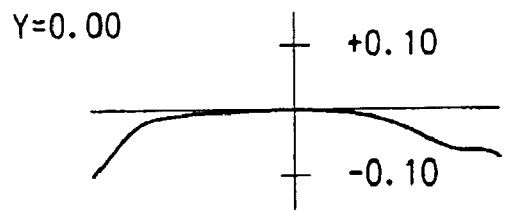
FIG. 10 is a graph showing a wavefront aberration when the decentering of 0.004 mm is generated between the surfaces of the objective lens according to the fourth embodiment when a compensation is applied.

If the optical base 26 is inclined such that the optical axis of the objective lens 24 and the normal to the optical disc 10 form an angle of 1.924°, the wavefront aberration is suppressed as shown in FIG. 10. In this case, the rms value of the residual wavefront aberration is 0.013λ, which indicates a sufficient performance of the objective lens 24.

Fifth Embodiment

The objective lens 24 according to the fifth embodiment will be described hereinafter.

The numerical configuration of the objective lens 24 according to the fifth embodiment will be indicated in TABLE 9, and coefficients indicating the spherical surfaces thereof are indicated in TABLE 10.

TABLE 9

| | f = 2.350 Surface | NA 0.85 | | |
|---|---|---|---|---|
| Number | | r | d | n |
| #1 | | 1.733 | 2.340 | 1.76250 |
| #2 | | 21.834 | 0.916 | |
| #3 | | ∞ | 0.100 | 1.62231 |
| #4 | | ∞ | | |

TABLE 10

| | 1st surface (#1) | 2nd surface (#2) |
|---|---|---|
| K | −0.3810 | 0.0000 |
| $A_4$ | $2.82422 \times 10^{-07}$ | $5.24900 \times 10^{-02}$ |

TABLE 10-continued

| | 1st surface (#1) | 2nd surface (#2) |
|---|---|---|
| $A_6$ | $-2.07720 \times 10^{-05}$ | $-3.56982 \times 10^{-02}$ |
| $A_8$ | $-1.84545 \times 10^{-05}$ | $1.75347 \times 10^{-02}$ |
| $A_{10}$ | $9191794 \times 10^{-07}$ | $-4.63944 \times 10^{-03}$ |
| $A_{12}$ | $-4.02700 \times 10^{-06}$ | $5322457 \times 10^{-04}$ |

Figure 11A:
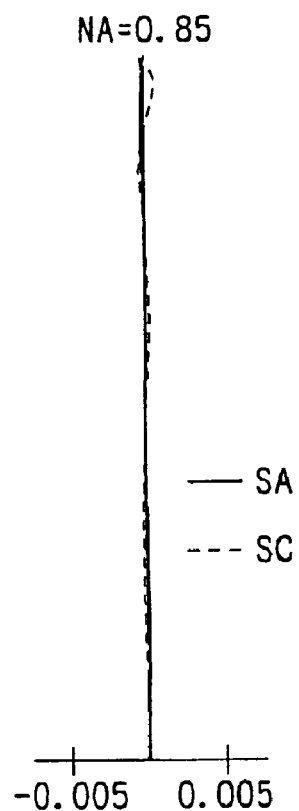
FIG. 11A is a graph showing the spherical aberration and an offence against the sine condition under a reference design condition, according to a fifth embodiment.
Figure 11B:
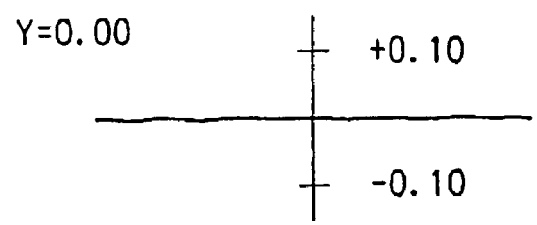
FIG. 11B is a graph showing a wavefront aberration.

FIG. 11A is a graph showing the spherical aberration SA and an amount SC of an offence against a sine condition under the reference condition and the optical axis of the objective lens is perpendicular to the optical disc 10. FIG. 11B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.230λ, which cannot be used as an objective lens for recording data on the optical disc 10.

Figure 12:
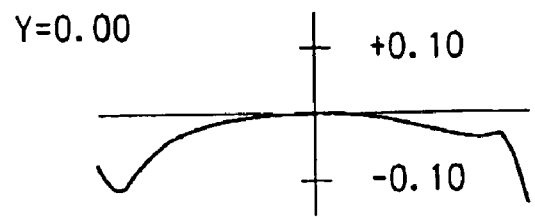
FIG. 12 is a graph showing a wavefront aberration when the decentering of 0.004 mm is generated between the surfaces of the objective lens according to the fifth embodiment when a compensation is applied.

If the optical base 26 is inclined such that the optical axis of the objective lens 24 and the normal to the optical disc 10 form an angle of 2.076°, the wavefront aberration is suppressed as shown in FIG. 12. In this case, the rms value of the residual wavefront aberration is 0.014λ, which indicates a sufficient performance of the objective lens 24.

Sixth Embodiment

The objective lens 24 according to the sixth embodiment will be described hereinafter.

The numerical configuration of the objective lens 24 according to the sixth embodiment will be indicated in TABLE 11, and coefficients indicating the spherical surfaces thereof are indicated in TABLE 12.

TABLE 11

| | f = 2.350 Surface | NA 0.85 | | |
|---|---|---|---|---|
| Number | | r | d | n |
| #1 | | 1.735 | 2.350 | 1.76050 |
| #2 | | 24.657 | 0.913 | |
| #3 | | ∞ | 0.100 | 1.62231 |
| #4 | | ∞ | | |

TABLE 12

| | 1st surface (#1) | 2nd surface (#2) |
|---|---|---|
| K | −0.3850 | 0.0000 |
| $A_4$ | $1.07300 \times 10^{-04}$ | $5.57000 \times 10^{-02}$ |
| $A_6$ | $7.14600 \times 10^{-05}$ | $-2.95400 \times 10^{-02}$ |
| $A_8$ | $-3.65000 \times 10^{-06}$ | $1.11800 \times 10^{-02}$ |
| $A_{10}$ | $8.84100 \times 10^{-06}$ | $-2.41100 \times 10^{-03}$ |
| $A_{12}$ | $-2.21700 \times 10^{-06}$ | $2.24700 \times 10^{-04}$ |

Figure 13A:
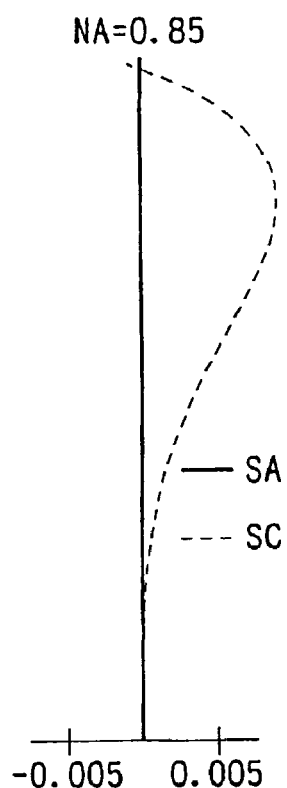
FIG. 13A is a graph showing the spherical aberration and an offence against the sine condition under a reference design condition, according to a sixth embodiment.
Figure 13B:
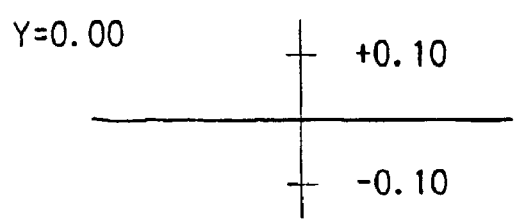
FIG. 13B is a graph showing a wavefront aberration.

FIG. 13A is a graph showing the spherical aberration SA and an amount SC of an offence against a sine condition under the reference condition and the optical axis of the objective lens is perpendicular to the optical disc 10. FIG. 13B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.247λ, which cannot be used as an objective lens for recording data on the optical disc 10.

Figure 14:
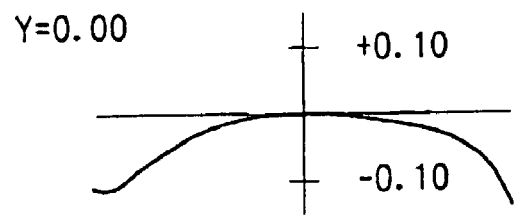
FIG. 14 is a graph showing a wavefront aberration when the decentering of 0.004 mm is generated between the surfaces of the objective lens according to the sixth embodiment when a compensation is applied.

If the optical base 26 is inclined such that the optical axis of the objective lens 24 and the normal to the optical disc 10 form an angle of 2.199°, the wavefront aberration is suppressed as shown in FIG. 14. In this case, the rms value of the residual wavefront aberration is 0.013λ, which indicates a sufficient performance of the objective lens 24.

Seventh Embodiment

The objective lens 24 according to the seventh embodiment will be described hereinafter.

The numerical configuration of the objective lens 24 according to the seventh embodiment will be indicated in TABLE 13, and coefficients indicating the spherical surfaces thereof are indicated in TABLE 14.

TABLE 13 f = 1.000

| Surface Number | NA 0.80 | | |
|---|---|---|---|
| | r | d | n |
| #1 | 0.676 | 1.326 | 1.56023 |
| #2 | −0.967 | 0.234 | |
| #3 | ∞ | 0.100 | 1.62231 |
| #4 | ∞ | | |

TABLE 14

| | 1st surface (#1) | 2nd surface (#2) |
|---|---|---|
| K | −0.5200 | 0.0000 |
| $A_4$ | $2.06448 \times 10^{-02}$ | $5.51772 \times 10^{+00}$ |
| $A_6$ | $3.32397 \times 10^{-02}$ | $-3.88077 \times 10^{+01}$ |
| $A_8$ | $3.80805 \times 10^{-02}$ | $1.85027 \times 10^{+02}$ |
| $A_{10}$ | $6.37704 \times 10^{-02}$ | $-5.07488 \times 10^{+02}$ |
| $A_{12}$ | $-6.35130 \times 10^{-02}$ | $6.06055 \times 10^{+02}$ |

Figure 15A:
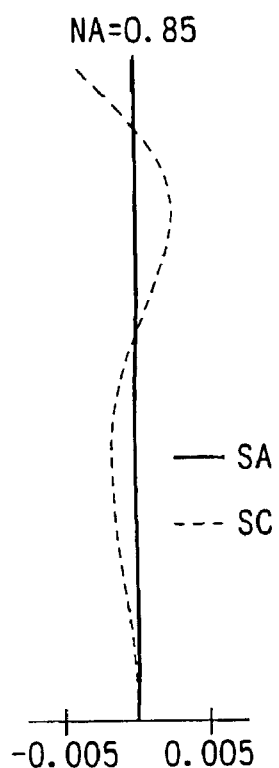
FIG. 15A is a graph showing the spherical aberration and an offence against the sine condition under a reference design condition, according to a seventh embodiment.
Figure 15B:
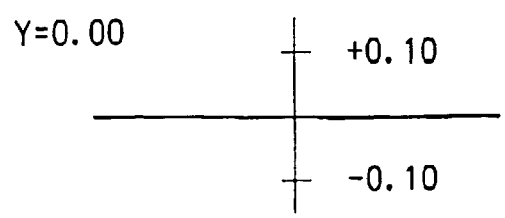
FIG. 15B is a graph showing a wavefront aberration.

FIG. 15A is a graph showing the spherical aberration SA and an amount SC of an offence against a sine condition under the reference condition and the optical axis of the objective lens is perpendicular to the optical disc 10. FIG. 15B is a graph showing the wavefront aberration.

If the first surface of the objective lens 24 is decentered relative to the second surface by 0.004 mm, unless the optical axis of the objective lens 24 is inclined with respect to the optical disc 10, the decentering coma is generated and the wavefront is disturbed. Under this condition, the rms value of the wavefront aberration is 0.153λ, which cannot be used as an objective lens for recording data on the optical disc 10.

Figure 16:
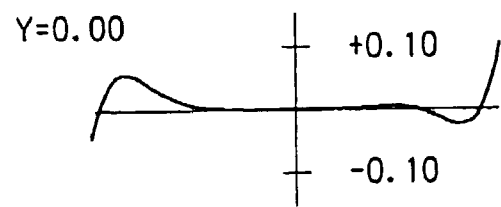
FIG. 16 is a graph showing a wavefront aberration when the decentering of 0.004 mm is generated between the surfaces of the objective lens according to the seventh embodiment when a compensation is applied.

If the optical base 26 is inclined such that the optical axis of the objective lens 24 and the normal to the optical disc 10 form an angle of 1.893°, the wavefront aberration is suppressed as shown in FIG. 16. In this case, the rms value of the residual wavefront aberration is 0.021λ, which indicates a sufficient performance of the objective lens 24.

Next, conditions (1) through (4) for the above-described embodiments are summarized.

It should be noted that condition (2) is similar to condition (1) except that condition (2) defines a narrower range. Regarding conditions (1) and (2), it is necessary to determined the proportionality factor α. The proportionality factor α should be determined such that a sum of a former term representing the aberration due to the decentering of the lens surfaces and a latter term representing the aberration due to the inclination of the optical axis of the objective lens with respect to the optical disc for all distances h from the optical axis becomes closer to zero. In other words, the proportionality factor α should be determined such that a sum of the expression sandwiched between the inequality signs with respect all distances h is the closest to zero.

TABLE 15 shows values of each embodiment with respect to conditions (3) and (4).

TABLE 15

| condition | (3) | (4) |
|---|---|---|
| 1st EMBODIMENT | 0.1531 | 7.735 |
| 2nd EMBODIMENT | 0.1570 | 7.896 |
| 3rd EMBODIMENT | 0.1456 | 7.400 |
| 4th EMBODIMENT | 0.1673 | 8.396 |
| 5th EMBODIMENT | 0.1855 | 9.060 |
| 6th EMBODIMENT | 0.1949 | 9.595 |
| 7th EMBODIMENT | 0.1228 | 8.260 |

TABLE 16 shows a value corresponding to condition (1) or (2) for each embodiment with reference to a pupil coordinate. The pupil coordinate is defined as a ratio represented by h/hmax, where h represents a distance with respect to the optical axis, and hmax represents an outermost position of a pupil of the objective lens with respect to the optical axis thereof. Therefore, values indicated in TABLE 16 represent amounts of aberration for rays respectively passing the pupil coordinates. calculated from equation (4).

TABLE 16

| Pupil coor-dinate | 1st EMB. | 2nd EMB. | 3rd EMB. | 4th EMB. | 5th EMB. | 6th EMB. | 7th EMB. |
|---|---|---|---|---|---|---|---|
| 1.00 | −0.0016 | −0.0008 | −0.0024 | −0.0015 | −0.0034 | −0.0021 | −0.0036 |
| 0.90 | −0.0005 | −0.0011 | 0.0009 | −0.0001 | −0.0039 | −0.0018 | 0.0025 |
| 0.80 | 0.0028 | 0.0020 | 0.0039 | 0.0017 | −0.0021 | −0.0014 | 0.0030 |
| 0.70 | 0.0023 | 0.0020 | 0.0041 | 0.0020 | −0.0006 | −0.0009 | 0.0019 |
| 0.60 | 0.0010 | 0.0011 | 0.0032 | 0.0015 | 0.0000 | −0.0006 | 0.0009 |
| 0.50 | 0.0003 | 0.0005 | 0.0020 | 0.0010 | 0.0001 | −0.0004 | 0.0003 |
| 0.40 | 0.0000 | 0.0002 | 0.0011 | 0.0005 | 0.0001 | −0.0002 | 0.0001 |
| 0.30 | 0.0000 | 0.0000 | 0.0005 | 0.0002 | 0.0001 | −0.0001 | 0.0000 |
| 0.20 | 0.0000 | 0.0000 | 0.0001 | 0.0001 | 0.0000 | 0.0000 | 0.0000 |
| 0.10 | 0.0000 | 0.0000 | 0.0000 | 0.0000 | 0.0000 | 0.0000 | 0.0000 |
| 0.00 | 0.0000 | 0.0000 | 0.0000 | 0.0000 | 0.0000 | 0.0000 | 0.0000 |

As indicated in TABLE 16, in each embodiment, conditions (1) and (2) are satisfied for every distance h. Therefore, in each embodiment, the coma generated due to the decentering of the surfaces of the objective lens can be well compensated by inclining the optical axis of the objective lens with respect to the optical disc. Further, as shown in TABLE 15, in each embodiment, conditions (3) and (4) are satisfied. Therefore, the decentering coma generated due to the decentering of the surfaces of the objective lens and the abaxial coma are well balanced.

The present disclosure relates to the subject matter contained in Japanese Patent Application No. 2001-283538, filed on Sep. 18, 2001, which is expressly incorporated herein by reference in its entirety.

What is claimed is:

1. A single-element objective lens for an optical pick-up, said objective lens directing an incident light beam to a data recording surface of an optical disc through a cover layer to form a beam spot, a numerical aperture of said objective lens being 0.7 or more, said objective lens being configured such that a characteristic of aberration due to decentering of surfaces of said objective lens is substantially comparable to a characteristic of aberration due to an inclination of an optical axis of said objective lens and a central axis of the light beam incident on the data recording surface of the optical disc with respect to the optical disc, and such that there exists a coefficient $\alpha$ with which condition:

$$-0.01 < \frac{X}{1+X^2} \times \left(-1 + \sqrt{n_0^2 + (n_0^2-1)X^2}\right) - h(n_0-1)c + \alpha\left(tNA\left(-\frac{1}{n_d} + \frac{\sqrt{1-NA^2}}{\sqrt{n_d^2-NA^2}}\right)\right) < 0.01$$

is satisfied, wherein, X represents a differentiation, with respect to h, of a function g(h), which is a SAG amount of the first surface of the objective lens at a height h from the optical axis thereof, c represents the differentiation of X with respect to h, $n_0$ represents a refractive index of the objective lens, $n_d$ represents a refractive index of the cover layer, t represents a thickness along the optical axis of the cover layer, NA represents a function NA(h) which is defined as NA(h)=h/f, f being a focal length of the objective lens, h being any value within a range $0 < h \leq h_{max}$, wherein $h_{max}$ is a maximum effective radius of a light beam on the first surface.

2. The objective lens according to claim 1, which is configured such that coma is compensated for by inclining an optical axis of said objective lens and the central axis of the light beam incident on the data recording surface of the optical disc with respect to the optical disc.

3. The objective lens according to claim 1, which is configured such that there exists a coefficient $\alpha$ with which condition:

$$-0.005 < \frac{X}{1+X^2} \times \left(-1 + \sqrt{n_0^2 + (n_0^2-1)X^2}\right) - h(n_0-1)c + \alpha\left(tNA\left(-\frac{1}{n_d} + \frac{\sqrt{1-NA^2}}{\sqrt{n_d^2-NA^2}}\right)\right) < 0.005$$

is satisfied.

4. The objective lens according to claim 1, which is configured to satisfy a condition:

$$0.08 < \frac{X}{1+X^2} \times \left(-1 + \sqrt{n_0^2 + (n_0^2-1)X^2}\right) - h(n_0-1)c < 0.30,$$

wherein h being equal to $h_{max}$.

5. The objective lens according to claim 1, wherein the coefficient $\alpha$ being greater than five and less than twelve.

6. An optical pick-up, comprising:

a laser source that emits a laser beam;

a single-element objective lens, said objective lens directing the laser beam emitted by said laser source to a data recording surface of an optical disc through a cover layer to form a beam spot, a numerical aperture of said objective lens being 0.7 or more; and an inclination adjusting mechanism which adjusts an inclination of an optical axis of said objective lens and a central axis of the laser beam incident on the cover layer with respect to the optical disc, wherein said objective lens is configured such that a characteristic of aberration due to decentering of surfaces of said objective lens is substantially comparable to a characteristic of aberration due to an inclination of an optical axis of said objective lens and a central axis of the light beam incident on the data recording surface of the optical disc with respect to the optical disc, and such that there exists a coefficient $\alpha$ with which condition:

$$-0.01 < \frac{X}{1+X^2} \times \left(-1 + \sqrt{n_0^2 + (n_0^2-1)X^2}\right) - h(n_0-1)c + \alpha\left(tNA\left(-\frac{1}{n_d} + \frac{\sqrt{1-NA^2}}{\sqrt{n_d^2-NA^2}}\right)\right) < 0.01$$

is satisfied, wherein, X represents a differentiation, with respect to h, of a function g(h), which is a SAG amount of the first surface of the objective lens at a height h from the optical axis thereof, c represents the differentiation of X with respect to h, $n_0$ represents a refractive index of the objective lens, $n_d$ represents a refractive index of the cover layer, t represents a thickness along the optical axis of the cover layer, NA represents a function NA(h) which is defined as NA(h)=h/f, f being a focal length of the objective lens, h being any value within a range $0 < h \leq h_{max}$, wherein $h_{max}$ is a maximum effective radius of a light beam on the first surface.

7. The optical system according to claim 6, wherein said objective lens is configured such that coma is compensated for by inclining an optical axis of said objective lens and the central axis of the light beam incident on the data recording surface of the optical disc with respect to the optical disc.

8. The optical system according to claim 6, wherein said objective lens is configured such that there exists a coefficient $\alpha$ with which condition:

$$-0.005 < \frac{X}{1+X^2} \times \left(-1 + \sqrt{n_0^2 + (n_0^2-1)X^2}\right) - h(n_0-1)c + \alpha\left(tNA\left(-\frac{1}{n_d} + \frac{\sqrt{1-NA^2}}{\sqrt{n_d^2-NA^2}}\right)\right) < 0.005$$

is satisfied.

9. The optical system according to claim 6, wherein said objective lens is configured to satisfy a condition:

$$0.08 < \frac{X}{1+X^2} \times \left(-1 + \sqrt{n_0^2 + (n_0^2-1)X^2}\right) - h(n_0-1)c < 0.30,$$

wherein h being equal to $h_{max}$.

10. The optical system according to claim 6, wherein the coefficient $\alpha$ being greater than five and less than twelve.

* * * * *